United States Patent [19]

Rosberg et al.

[11] Patent Number: 5,035,799
[45] Date of Patent: Jul. 30, 1991

[54] FILTER ASSEMBLY

[75] Inventors: Louis Rosberg, Southfield; Devendra V. Mehta, Bloomfield Hills; Aaron Rosberg, Southfield; Ron Billbury, Algonac, all of Mich.

[73] Assignee: Clear Flow, Inc., Southfield, Mich.

[21] Appl. No.: 396,133

[22] Filed: Aug. 21, 1989

[51] Int. Cl.$^5$ .................... B01D 29/00; B01D 29/39
[52] U.S. Cl. .................... 210/232; 210/323.1; 210/333.01; 210/346; 210/416.1; 210/411; 210/456; 210/486
[58] Field of Search ............... 210/232, 323.1, 333.01, 210/346, 416.1, 411, 486, 456

[56] References Cited

U.S. PATENT DOCUMENTS

| | | |
|---|---|---|
| 1,218,848 | 3/1917 | Foster . |
| 2,013,776 | 9/1935 | Wiesman .................. 210/182 |
| 2,028,466 | 2/1936 | Moran .................. 210/486 |
| 2,255,519 | 9/1941 | Preston .................. 133/57 |
| 2,342,035 | 2/1944 | Clark .................. 210/486 |
| 2,657,808 | 11/1953 | Mankin .................. 210/184 |
| 2,930,754 | 3/1960 | Stuckey .................. 210/23 |
| 3,085,687 | 4/1963 | Erbach .................. 210/195 |
| 3,165,470 | 1/1916 | Giese et al. .................. 210/307 |
| 3,170,873 | 2/1965 | May .................. 210/307 |
| 3,171,808 | 3/1965 | Todd .................. 210/321 |
| 3,295,687 | 1/1967 | Schmerler .................. 210/486 |
| 3,397,141 | 8/1968 | Nakai .................. 210/22 |
| 3,481,479 | 12/1969 | Hoskins et al. .................. 210/486 |
| 3,559,809 | 2/1971 | Barmore .................. 210/333 |
| 3,567,028 | 3/1971 | Nose .................. 210/232 |
| 3,623,614 | 11/1971 | Schmidt, Jr. .................. 210/486 |
| 3,627,137 | 12/1971 | Bler .................. 210/321 |
| 3,635,343 | 1/1972 | Holland .................. 210/104 |
| 3,744,641 | 7/1973 | Schmidt, Jr. .................. 210/486 |
| 3,864,108 | 2/1975 | Brookman .................. 55/302 |
| 4,264,345 | 4/1981 | Miller .................. 55/341 R |
| 4,504,391 | 3/1985 | Weems, Sr. .................. 210/307 |
| 4,519,903 | 5/1985 | Johnson .................. 210/94 |
| 4,579,656 | 4/1986 | Johnson .................. 210/234 |
| 4,670,118 | 6/1987 | Klinkowski .................. 204/182.2 |
| 4,790,935 | 12/1988 | Johnson .................. 210/232 |

FOREIGN PATENT DOCUMENTS

| | | |
|---|---|---|
| 521850 | 2/1956 | Canada .................. 210/346 |
| 73740 | 11/1892 | Fed. Rep. of Germany ...... 210/346 |
| 18234 | of 1915 | United Kingdom .................. 210/486 |

Primary Examiner—Peter Hruskoci
Assistant Examiner—Robert James Popovics
Attorney, Agent, or Firm—Weintraub, DuRoss & Brady

[57] ABSTRACT

A closed, cross-flow fluid filter assembly having a pressurized input line for polluted fluids entering into a closed header box. The closed header box fits within a filter tank and is provided with apertures and spacer assemblies on the bottom wall thereof communicating with the filter tank, the apertures providing the pressurized fluid thereto. Filter leaf assemblies are arranged in parallel within the filter tank and are maintained at their top edges in spaced relation by the spacer assemblies. The filter leaf assemblies are composed of abutting offset grids, contained within a fluid tight frame which is covered on each side by a filter media. The filter leafs are drained of filtrate through a medial tube connected to a central manifold which is connected to a vacuum source. Flow-through backwash stop-grids are arranged in the filter tank to prevent excessive bulging of the filter membranes during backwash for cleaning of the filter media. The filter media are also cleansed by the shearing effect of the pressurized input fluid flowing over filter media faces. Unfiltered fluid passes out of the filter tank at the bottom thereof. The filter assembly is designed in modular fashion with quickly releasable parts for ease of maintenance and flexibility.

20 Claims, 3 Drawing Sheets

FIG 5

FILTER ASSEMBLY

BACKGROUND OF THE INVENTION

1. Field of the Invention

The present invention relates to fluid filtration assemblies which use filter leafs. More particularly, the present invention relates to a closed loop, crossflow fluid filter assembly having a pressurized input to create a turbulent crossflow of fluid over the filter media faces of the filter leafs which are mounted to an outtake, or filtrate, manifold which is, in turn, connected to a vacuum source. The present invention further relates to mounted grids having a fluid path therethrough to create turbulence and to maintain a proper spatial relation among the tank and filter media during backwash filter cleaning operations.

2. Description of the Relevant Art

Heretofore there have been provided fluid filtration assemblies using filter leafs carrying filter membranes or other filtering media of known porosity. These devices generally comprise:

a tank for receiving contaminated fluids, filter leafs, which carry the filtering media, having an inside core for receiving and collecting filtered fluid, and connected to a clean fluid outlet external to the tank, and, a sedimentation collecting portion of the tank with a sediment outlet.

Efficiency of filtration in these systems is directly proportional to the fluid volume opposing the filter membrane surface area. Factors impinging on this efficiency include: pressure differential between the inside and outside of the filter leaf, the vector of fluid flow over the membrane, the surface area of the filter media, and the porosity of the membrane. It is evident that a fluid vector directly opposing the surface of the membrane is most desired to provide maximum fluid pressure in the desired filtration path, i.e., perpendicular to the plane surface of the media. Also, the less porous the filter media, the more need for fluid pressure to help speed the process of passing the desired fluid through the filter media which presents a barrier to particles beyond the pore size of the media.

However, as particles are barred passage through the media they will accumulate thereon, clogging the pores and decreasing the usable surface area of the media. With a perpendicular flow, the fluid pressure will act to trap these particles on the media surface, soon resulting in decreased efficiency of filtration.

Heretofore, the filtration devices provided have sought to solve this problem by utilizing a lateral flow over the media face or utilizing a slow fluid flow rate through the tank and encouraging a perpendicular flow vector to the filter media by providing suction on the interior of the filter leaf core to create the proper pressure differential across the media face. Further, regular backwashing of the filter leafs is often utilized.

The known devices thus sacrifice efficiency through buildup of particulates on the media face or by not providing a maximum pressure differential across the media face.

Further, the known devices heretofore have been unnecessarily complicated in material and design through the addition of extra support fittings needed to maintain proper spatial relation between closely spaced filter leafs. The prior devices require strong mechanical attachment means on the leaf core to filtered fluid drain junction and/or additional support frames over the top of the leafs which also decreases fluid flow over the membrane surfaces.

Finally, when utilizing closely spaced filter leafs, scant attention has been paid to providing proper flow-through spacing means to prevent filter media from touching one another or the tank walls when the media bulge outward under the pressure of the backwash cleaning process, thereby resulting in trapped particles on the media face.

The present invention gains increased efficiency of filtration by providing a high velocity turbulent flow of fluid having vectors parallel, lateral, perpendicular, and oblique to the media faces. The flow established thereby acts to shear particulate buildup from the media face while maintaining a fluid cross flow in the desired path through the media. The desired fluid flow path is further encouraged in the present invention by providing a vacuum source to the core of the filter leaf, thereby increasing the pressure differential across the media face.

Flow-through grids are affixed throughout the tank to provide positional stability for the leaf filter media during backwashing processes and to enhance turbulent fluid flow during filtration.

U.S. Pat. No. 3,559,809 describes a non-pressurized input filter system having individual filter membrane units. It is primarily directed to a backwash flow system utilizing a tank for dirty fluid and a separate tank for clean fluid. The clean fluid flow lines utilize an in-line eductor to create suction for the filter membranes.

U.S. Pat. No. 2,013,776 describes a closed tank filter system for drycleaning systems utilizing individual filter units separated by wire rack devices. The flow may be input alternately from the top or bottom of the tank. No suction is applied to the filter units' central manifold, nor is provision made for directing pressurized flow between the filter membranes. A sediment trap is located in the bottom of the tank.

U.S. Pat. No. 4,519,903 discloses an open tank parallel filter leaf apparatus utilizing bilateral manifolds whose connective conduit is attached to a suction pump. The polluted fluid is input to a holding trough from whence it spills into the open tank. Beneath the filter leafs is a sedimentation tank portion. The filter units are comprised of opposing grids, with holes defining channels through each section, attached to a lateral collection pipe. The grid and pipe assembly is then completely covered with a filter bag.

A filter system similar to U.S. Pat. No. 4,519,903, but having a series of pressurized input fluid conduits disposed above the parallel spaced filter leaves is also known to applicants.

U.S. Pat. No. 3,623,614 discloses a filter leaf core having a pair of studded outer sheets bonded to a resilient core. The outer sheets are overlayed by filter screens. Screens and core are encased in a fluid conductive frame which empties into a collection pipe on the frame bottom.

While it is evident from the foregoing that there are known many arrangements of filter leaf filtration devices, all of the known references present elaborate structural requirements resulting in filter systems that are harder to build, harder to clean, result in larger amounts of particulate buildup on the membrane faces and thus are prone to more frequent maintenance than the current invention.

It is believed by applicants that no existing system of filter leaf filtration offers the combined advantages of modularity, versatility, ease of manufacture, high filtering rate, low filter media clogging, and efficiency of back wash mechanisms and ease of cleaning the structure, presented in the invention described herein.

SUMMARY OF THE INVENTION

The present invention provides a closed loop, crossflow, fluid filter assembly utilizing a through-put presurized fluid path which presents the filtrable fluid to filter leafs whose interiors are connected to a vacuum source.

The filter assembly comprises, in basic form, four sections: a pressurized intake header box; a filter tank with a drain and/or recycle means; a filtration mechanism, under vacuum, contained within the filter tank and having a clean, or filtered, fluid outlet external to the filter tank; and, a backwash system for cleaning the filter media.

A filtrable fluid input line having a pressure source attached thereto is affixed to a substantially closed header box. The header box rests within the filter tank and has a pierced wall covering the filter tank to provide a flow-through chamber. The pierced wall has apertures therein for injecting pressurized fluid into the filter tank.

The filter tank contains a plurality of filter leafs having a support structure for filter media of known porosity and pore size. The filter leafs are removably connected to a filtrate manifold in a parallel, closely spaced manner. The upper edges of each filter leaf are fitted between spacer assemblies mounted on the down stream side of the header box pierced wall.

The filtrate manifold is releasably mounted within the filter tank and passes externally from the filter tank. The filtrate manifold is connected to a vacuum source which, if necessary, is reversible for bi-directional fluid movement. Part of the filtrate is delivered to a filtrate storage tank for later use in backwash operations.

Backwash stop-grids are located opposite all filter media faces to oppose any outward bulging of the media away from its associated leaf frame. These grids may be affixed to the filter tank walls, the header box, or the leaf frame.

The filtrable fluid is introduced by a pressurized input line to the closed header box. The header box apertures direct the fluid input path closely parallel to the filter leaf media surfaces. The pressurized fluid thus injected between the filter leafs travels outward and downward from the apertures between the leafs, presenting a swirling crossflow of filtrable fluid to the filter media surface. The fluid flows into the media face aiding the filtration process as well as flowing in parallel along the media face, providing a shearing effect to minimize particulate buildup on the face of the media to keep the filters operating efficiently.

The filter leafs are constructed from abutting offset grids surrounded by a fluid tight frame. A medial collection tube, which collects the filtered fluid, or filtrate, from the grids, exits the frame and is removably connected to a filtrate manifold. The manifold is releasably contained in the filter tank and is connected to the vacuum source to further aid the desired fluid flow into and through the filters. Each leaf is provided with an air vent in the frame and/or gas permeable hydrophobic areas located on the filter media to aid in pressure equalization during start up operations and to effectively release trapped air within the leaf througout filtering operations. The offset grid arrangement of the leaf assembly has been found to provide an economical and efficient flow-through mounting means for the filter media.

Spaced throughout the filter tank in opposition to all membrane faces are flow-through backwash stop-grids. These backwash stop-grids are necessary for efficient backwashing of the filters, and are efficacious in providing the desired fluid flow path. When pressure is reversed in the filtered fluid line to pump clean fluid outward through the filter leaf assembly the media will bulge outward. The stop-grids prevent excessive bulging which may tear the media or allow opposing membranes to touch one another or a tank wall, holding the particulates accumulated thereon. The stop-grids also narrow the fluid flow channel and provide turbulence to the flow.

A modulating control valve is provided downstream of the filter leaf assemblies on the filter tank drain line. The unfiltered fluid, now more concentrated with pollutants after passing beyond the filtration area, escapes out the bottom drain where it may be recirculated to the filter device intake, returned to its environment, or passed through a concentrated particle discharge line to save the particulates that were filtered out. The bottom drain is valved to allow for further fine tuning of the fluid pressure within, and flow rate through, the system.

Other attendant advantages will be more readily appreciated as the same becomes better understood by reference to the following detailed description and considered with the accompanying drawings in which like reference symbols designate the parts throughout the figures.

DESCRIPTION OF THE PREFERRED EMBODIMENT

According to the present invention there is provided a cross flow fluid filter assembly 1, generally, comprising: a header box 3 for receiving a fluid to be filtered under pressure, a filter tank T1 in fluid communication with the header box 3 through a series of small apertures 4; spacers 6 for maintaining proper spatial relationships between filter leafs, filter leafs 8 disposed within the tank T1 and affixed to a filtrate manifold 12 for draining filtered fluid; backwash stop-grids 14 to contain the filter media during backwash and to create turbulence during filtering, a vacuum source P2 attached to the filtrate manifold; and a valve V7 for modulating the drain line L7 on the bottom of the tank T1. A filtrate storage tank T2 is provided to store a portion of the filtrate for use in backwashing the filter leafs 8. An overflow tank T3 is also provided in case the filter tank T1 should become overly full of filtrable liquid and for separating floating contaminants from the filtrable liquid.

It will be appreciated that the filter leafs will be closely spaced, in parallel, to provide a maximum filtration surface within the tank.

Figures 1, 2, 3, 4, 8:
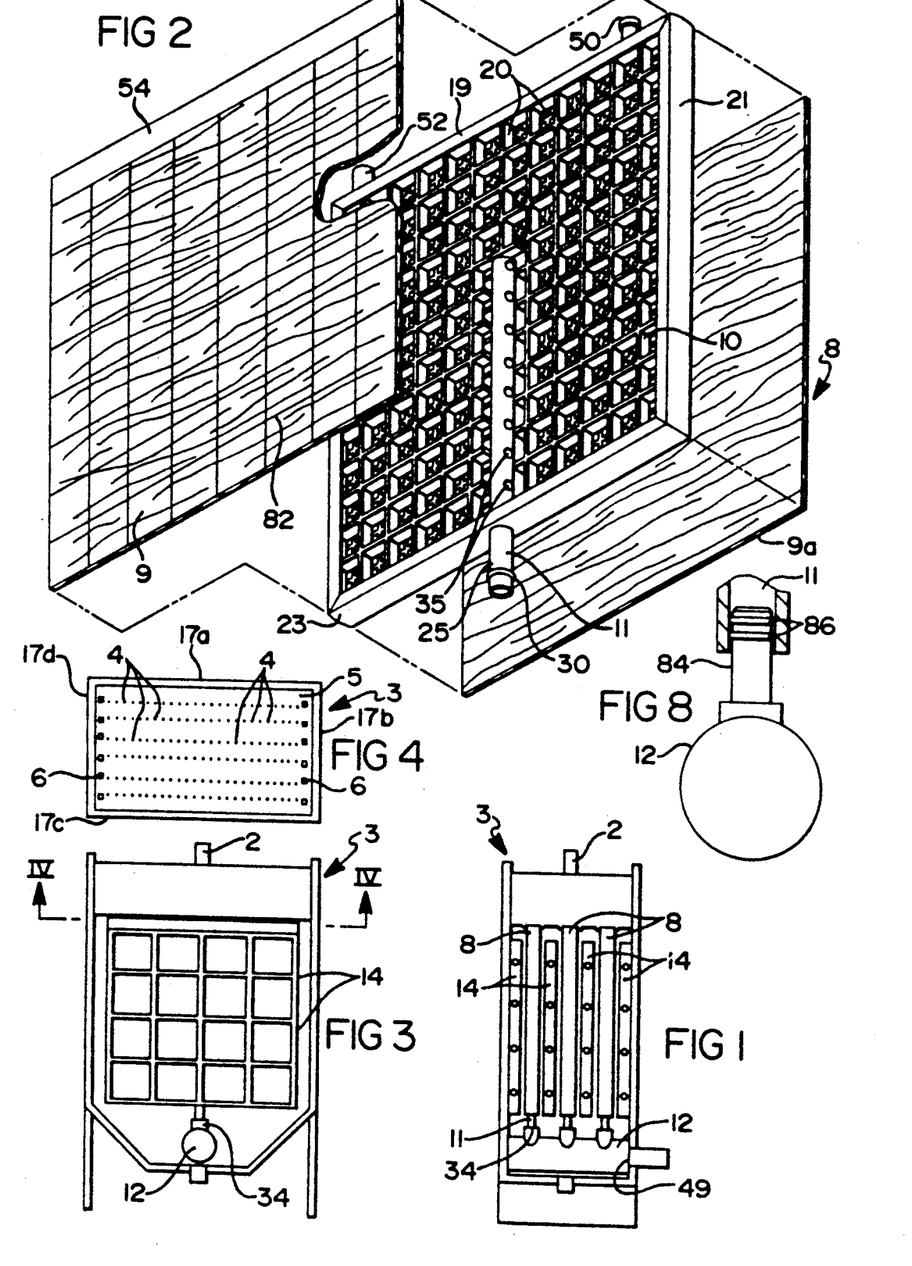
FIG. 1 is a end view of the filter tank portion of the present invention.
FIG. 2 is a detail of the filter leaf assembly used in the fluid filter assembly of the present invention.
FIG. 3 is a side view of the filter tank portion of the present invention.
FIG. 4 is a bottom plan view of the header box of the present invention taken along line IV—IV of FIG. 3.
FIG. 8 is a detail of one embodiment of the filter leaf to manifold connection.
Figure 5:
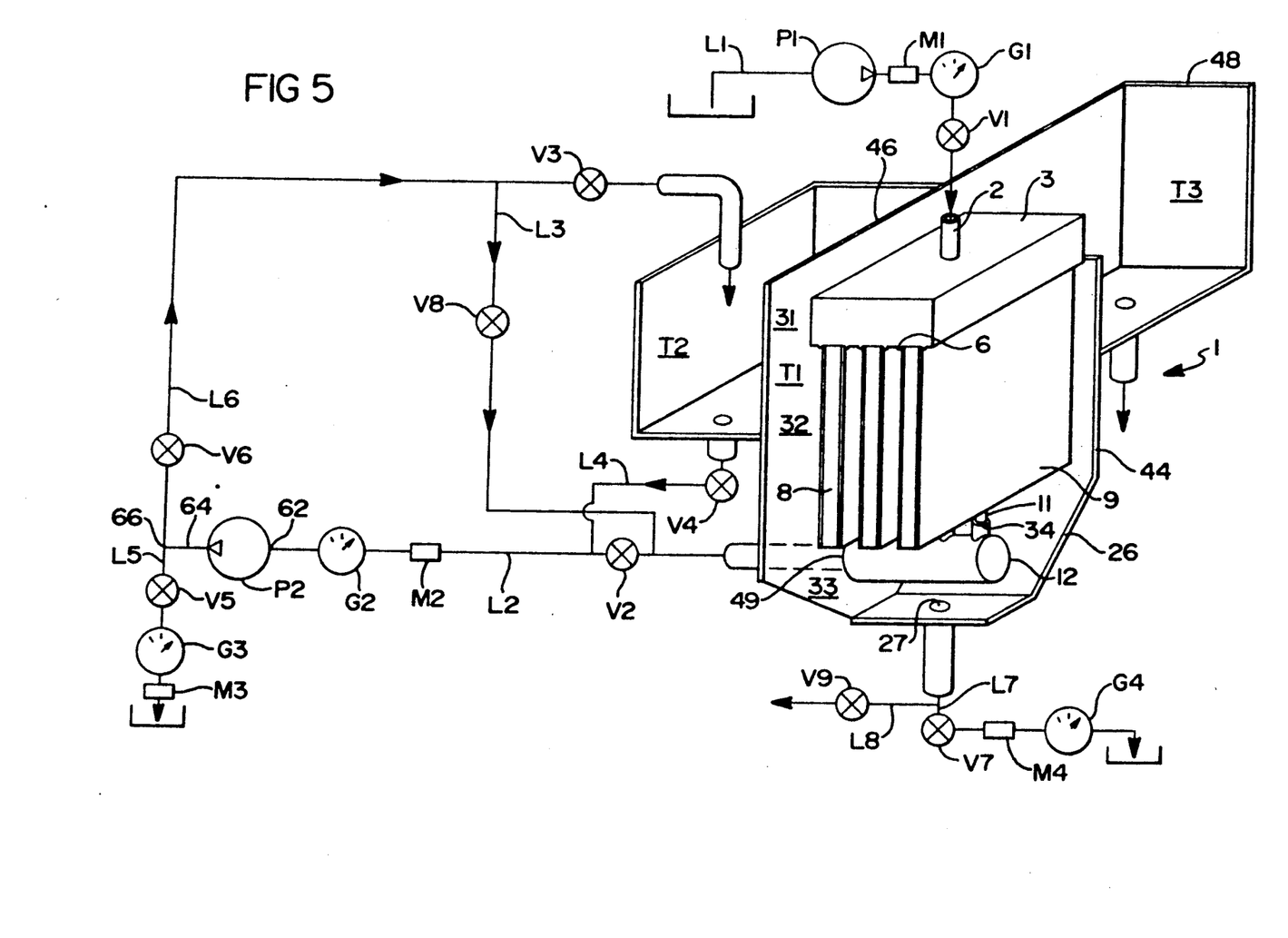
FIG. 5 is a cut-away perspective and partial schematic diagram of the filter assembly of the present invention showing the tanks, filter placement, and fluid flow lines thereof.

As seen in FIGS. 1 and 5, an input line L1 is in fluid communication with a header box 3. The input line L1 generally comprises a line attached to a source of filtrable fluid (not shown) for instance, surface water having a high degree of suspended particulate matter. An intake pump P1 is placed in line with input line L1 to pressurize the input filtrable fluid and to deliver fluid to the filter assembly 1. A pressure gauge G1 and a flow rate meter M1 may be placed on the input line L1 to monitor the pressure and flow rate of the incoming fluid. The input line L1 may have a pre-filter (not shown) provided to screen large particulates before they enter the header box 3.

The header box 3 has four side walls 17a, 17b, 17c, 17d, and a top wall 18 having an inlet port 2 for receiving the input line, and a pierced bottom wall 5 in fluid communication with the filter tank T1. The header box 3 rests within the filter tank T1 and may be manually removed without the use of tools. If necessary a shim may be placed between a header box side wall and a filter tank wall to positionally secure the header box 3 within the filter tank T1. The header box 3 and filter tank T1 are, preferably, constructed of transparent material so that the fluid filtration process and apparatus may be readily visually monitored. Of course, the filter tank T1 and header box 3 may be formed of steel or other suitable materials provided with viewing windows or the like, in lieu of an all transparent assembly.

As seen in FIG. 4, the header box bottom wall 5 has a plurality of apertures 4 formed therein and placed so as to inject the filtrable fluid into the tank T1 at those spaces between the filter leafs 8 and closely parallel to the filter media faces 9. In the preferred embodiment, the header box bottom wall 5 may frictionally engage a portion of each filter leaf assembly 8 to provide positional stability to the associated leaf assembly 8 as further explained below. The apertures 4 may be drilled holes or spigot jets or the like as required by the size and function of the filter assembly to form jets of filtrable fluid passing into the filter tank T1.

Figure 6:
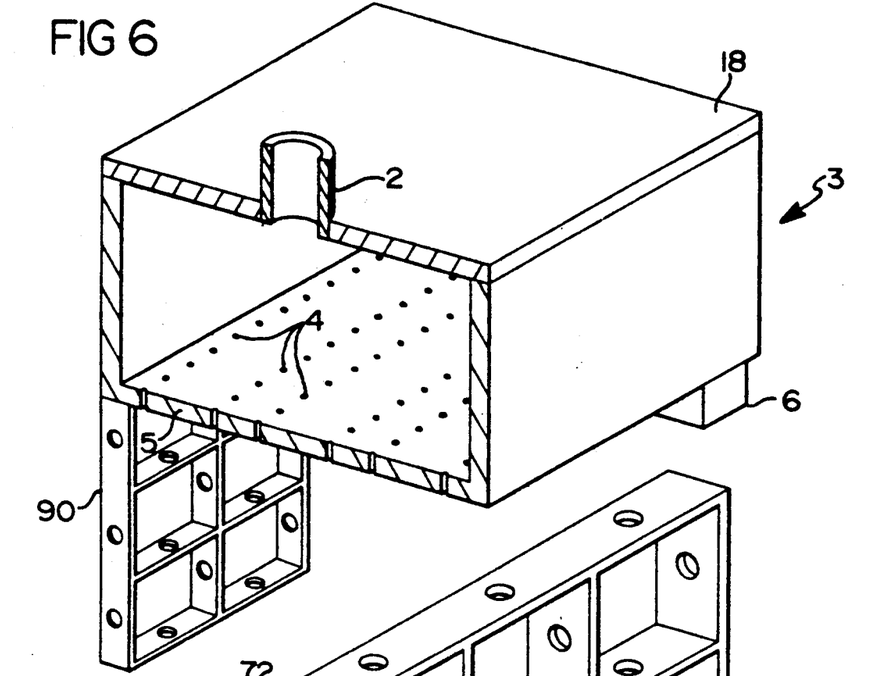
FIG. 6 is a cut-away perspective view of the header box showing an integral backwash stop-grid/spacer.

Attached to the header box bottom wall 5 and extending into filter tank T1 are spacers 6. These spacers 6 are located adjacent the filter leafs 8 in the form of four block, or finger-like, projections, one at each corner of the top frame member 19 of the filter leaf 8. The spacers 6 may also be formed as unitary ridges integral with the bottom wall 5; the main concern being the maintenance of proper filter leaf 8 spacing. Fluid may flow through the spacers, as by integrating the apertures 4 therein, but this is not required. Alternatively, the spacers 6 could be integrated with the backwash stop-grids 14 in a single structure extending from the header box bottom wall 5 into the filter tank T2 as seen in FIG. 6.

The fluid flow resulting from injection of pressureized fluid through header box apertures 4 will be turbulent, proceeding in a generally downward flow, parallel to the face of the filter media 9a with additional perpendicular and oblique flow vectors into the filter media face 9. The pressurized parallel flow will result in a shearing action removing accumulated particulate matter from the media face 9. The perpendicular and oblique flow vectors present an optimal fluid flow path in the direction of fluid filtration, i.e. from across the outer surface of the filter leaf 8 to the inside leaf core 10, i.e. crossflow filtration.

The upstream portion 31 of the filter tank T1 is sized so as to receive the header box 3. The filter tank T1 is an open tank structure having a drain hole 27 formed in the lowermost, or downstream, portion 33 of the tank. The filter tank T1 has a short side wall 44 on one side thereof which does not reach the filter tank upper edge 46. On that side of the filter tank T1 having the short side wall 44 is located an overflow tank T3, whose upper edge 48 is contiguous with the filter tank upper edge 46. The overflow tank T3 is thus in fluid communication with the filter tank T1 at those points above short side wall 44 and beneath the respective tank upper edges 46, 48. The overflow tank may thereby receive any filtrable liquid which rises above the level of short side wall 44 in order to prevent uncontained spillage of the filtrable liquid or for separation of any lighter, oily and immiscible nonaqueous phase that rises or floats to the top.

In the preferred embodiment, the upstream and midstream portions, 31 and 32 respectively, of the filter tank T1 are of generally rectangular cross section. The downstream portion 33 of the filter tank T1 is generally of a compressed conical shape having sloping sidewalls 26 located above the drain hole 27 to reduce sedimentation associated with a tank having either square corners or a flat bottom surface or both.

A drain line L7 is sealingly affixed to the filter tank at the downstream side of the drain hole 27. The drain line L7 has a modulating valve V7 therein for the regulation of fluid flow through the drain line L7, to thereby control the input-to-output balance of fluid in the filter system and hence the rate of crossflow therethrough. A flow meter M4 or pressure gauge G4 or both, as seen in FIG. 5, may be located in the drain line L7 for monitoring purposes to aid in the proper adjustment of drain valve V7 to control the cross flow of fluid.

The drain line L7 may have a recirculating apparatus (not shown) to return unfiltered fluid to the input of the filtering system if desired.

A concentrated particle discharge line L8 communicates with the drain line L7 for separate routing of particulates if the particulates are a desired end product of the filtration. The particle discharge line L8 contains particle discharge valve V9 for selective closing of the particle discharge line L8. Alternatively, drain line valve V7 could be of a kind to control both particle line L8 and drain line L7.

Filter tank backwash stop-grids 14 as seen in the embodiment of FIG. 1, are affixed to the walls of filter tank T1 to be held in opposition filter media 9 of the filter leafs 8 at a distance therefrom so as to arrest the outward bulging of the media faces during backwashing, thereby preventing a rupture of the media face 9 and the touching of media faces 9 on opposing structures which would impede backwash. The backwash stop-grids 14, as seen in FIG. 7, are constructed to permit fluid flow therethrough in substantially unimpeded fashion.

These backwash stop-grids 14 are located slightly off of, and parallel to, the media faces 9, to form a narrow fluid flow channel over the media face 9. The grids 14 thereby help sustain a high velocity fluid flow and, further, contribute to flow turbulence. As seen in FIG. 7, the typical backwash stop-grid 14 is a three dimensional structure whose height and width correspond to that of the media face 9. The depth of the backwash stop-grid 14 will be dependent on desired filter leaf 8 spacing but in general will be such as to allow for individual cells 70 to be formed. Each cell 70 has formed therein cross channel perforations 74, as by through holes in the cell walls 73, as shown, or as slots cut into the cell wall edges 72. These cross channel perforations 74 will allow fluid to move freely therein, and to escape from the backwash stop-grid 14 when the media face 9 covers the stop-grid 14 as the media 9a bulges during backwashing.

As seen in FIG. 6, the stop-grid 14 may be formed integrally with the spacer 6, to thereby provide both leaf spacing and filter media backwash stop-grid functions in a single unit 90 affixed to the bottom of header box bottom wall 5, as an alternative to affixing the stop-grids 14 to the filter tank walls.

Figure 7:
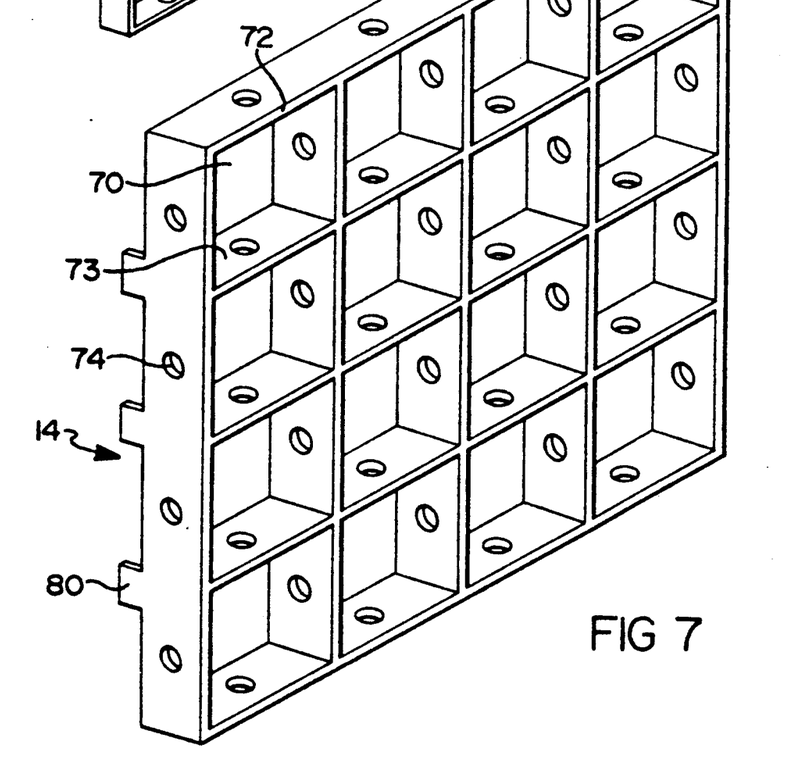
FIG. 7 is a perspective view of an embodiment of the backwash stop-grid of the present invention.

In another alternative, the spacer-grid 90 is affixed to the filter leaf frame 21 with standoff arms 80 as seen in FIG. 7. In yet another stop-grid alternative, a net 82 may be placed over the filter leaf 8, or attached to the leaf frame 21, so as to closely cover the media face 9 as seen in FIG. 2, thereby to prevent excessive bulging of the media 9' during backwashing. This alternative would be best utilized where the leafs 8 are so closely spaced as to make the typical stop-grid 14 impractical.

Located within filter tank T1 at the upstream and midstream portions 31, 32 thereof are a plurality of filter leafs 8. The upstream ends of the filter leafs 8 are substantially sequestered by spacers 6 adjacent the top frame member 19. The header box 3 from which the spacers 6 depend then rests with its bottom wall 5 abutting filter leaf air vent 50 and balance post 52. Alternatively, header box bottom wall 5 may be formed with cavitational voids therein which sequester the air vent 50 and balance post 52, allowing the header box bottom wall 5 to rest upon the leaf frame upper member 19, thereby providing further frictional stability.

Within the midstream portion of the filter tank T1 is located a filtrate manifold 12 releasably secured therein by a standard quick-release fluid-tight coupling 49 such as a press fit or bayonet mount. The quick-release coupling of the manifold allows for rapid changeover of manifolds having different characteristics, thereby increasing filter system flexibility. The filtrate manifold 12 has formed therein, on the upstream surface, apertures 34 for receiving the medial tube 11 of each filter leaf 8. A vacuum source such as a filtrate pump P2 is provided as a motive force for filtrate flow, and is connected to that portion of the filtrate line L2 exterior to the filter tank T1.

As more clearly seen in FIG. 2, the filter leafs 8 are constructed of a core 10 having abutting offset grids 20 contained within a fluid tight frame 21 wherein each of the offset grids comprises a plurality of parallel spaced apart first members aligned in a first direction, and a plurality of parallel spaced apart second members aligned in a second direction which is substantially perpendicular with respect to the first direction, the first and second members within each offset grid intersecting at a plurality of points to define intersection junctures; and wherein the intersection junctures of the abutting grids are offset from one another. A medial drain tube 11 is located within the frame and extends externally of the frame 21 through the bottom frame member 23. Holes 35 are provided in the wall of the drain tube 11 on the interior of the frame 21. These holes 35 are placed so as to intersect the plane between the abutting offset grids 20. It will be understood that a variety of apertures may be suitable for drain tube 11. Filter media 9, 9' are then sealingly attached around the frame perimeter to each side of the frame 21 by sonic welding, gluing, or the like. These filter media 9, 9' will often be delicate membranes which may tear under the operational strains of filtration if not restrained in their movements, either inward or outward, by the various structures of the leafs 8 and the filter tank T1 system.

An air vent 50 is located on the top frame member 19. On the opposite longitudinal side of the top frame member is located balance post 52 or an identical air vent. The air vent 50 functions to equalize internal and external filter leaf pressure during start up operations. The balance post 52 is sized and weighted to balance the physical characteristics of the air vent 50. A hydrophobic strip 54, or spot, of gas permeable material may be attached/applied onto the media face 9 in place of, or in addition to, the air vent 50 for use throughout operation of the filter. The material being hydrophobic, is gas permeable and will allow air trapped within the filter leaf core 10 to escape the leaf while retaining the filtrate. The abutting offset grids 20 allow the filtrate to travel through abutting individual grid cells 24 and provide a support framework for the media face 9, which will bulge inwardly when subjected to the pressurized fluid flow external to the leaf and the vacuum source P2 internally of the leaf. The offset grids prevent inward bulges of the media 9, 9' on opposing faces from directly opposing each other, thereby preventing localized restrictions of the internal flow path.

The external portion 25 of the medial tube 11 is connected by a releasable fluid tight fitting, such as one or more pressure fit o-ring bushings 30, to the central manifold 12. Alternatively, as shown in FIG. 8, the manifold 12 may have a transverse conduit 84 on the upstream side thereof surrounded by one or more o-rings 86. The filter leaf medial tube 11 then has an inside diameter of a size to fit over the transverse conduit 84 and o-rings 86 to releasably seal thereon. To replace a filter leaf 8 the operator then has merely to pull upward on the leaf to detach it from the manifold 12 and insert a new leaf. This single attachment point would allow the leaf to pivot when subjected to the forces of moving fluid if the leaf was unrestrained. Hence, the spacers 6 hold each leaf in the proper position by sequestering the upstream portion of the filter leaf 8. Further positional stability may be provided by frictional contact between the header box bottom wall 5 and the leaf air-vent 50 and balance post 52.

The central manifold 12 is coupled to the vacuum source filtrate pump P2 through the filtrate line L2. The filtrate pump P2 thereby aids the desired fluid flow through the media 9, 9' by lowering the pressure within the filter leafs and aids in the withdrawal of filtered fluid from the filter leaf core 10.

A filtrate storage, or backwash, tank T2 is located on or near that side of the filter tank T1 through which the filtrate line L2 passes. This backwash tank T2 holds a portion of the filtrate for use in backwashing the filter media 9, 9' should particulate build up on the media surface slow the filtering operation.

The filtrate-carrying lines L2–L6 are as follows. The filtrate line, or conduit, L2 is attached externally of the filter tank T1 at manifold coupling 48. The filtrate line L2 runs to the intake of filtrate pump P2. The intake 62 of the filtrate pump P2 may be supplied with a pressure gauge G2 and flow meter M2. At the discharge end 64 of the filtrate pump P2 a T-coupling 66 forms a filtrate discharge line L5 and a backwash tank fill line L6. The discharge line L5 preferably has a pressure gauge G3 and a flow meter M3 therein. The fill line L6 runs to the top of the backwash tank T2 to empty filtrate therein. A backwash line L3 runs between the filler line L6 and the filtrate line L2. A backwash tank emptying line L4 runs from a bottom portion of the backwash tank T2 into the filtrate line L2 at a point between the filtrate pump intake 62 and the backwash line L3 entry into the filtrate line L2.

The valving of the filtrate-carrying lines L2–L6 will now be described. It will be understood that these valves may be either manual valves, or controlled automatically by suitable servomechanisms in conjunction with line meterin information such as filtrate flow rate, vacuum pressure, etc.

A filtrate line valve V2 is located in filtrate line L2 at a point between the entries of the backwash line L3 and the emptying line L4 into the filtrate line L2. A discharge line valve V5 is located in the discharge line L5 proximal to the T-coupling 66. A filler line valve V6 is located in the filler line L6 proximal to the T-coupling 66. A tank shut-off valve V3 is located in the filler line L6 proximal to the entry of backwash line L3 into filler line L6. A backwash line valve V8 is located in the filler line L3 proximal to the filler line L3 entry into the filtrate line L2. An emptying line valve V4 is located in the emptying line L4 prior to the emptying line L4 entry into filtrate line L2.

It can be seen that by proper manipulation of the valves in the filtrate carrying lines, any of several basic filtrate flow routes may be affected. A discharge of filtrate out of the filter system may be had by opening only the filtrate line valve V2 and the discharge line valve V5. A quick filling of the backwash tank T2 may be had by opening filtrate line valve V2, filler line valve V6, and tank shut off valve V3. The backwash tank T2 could, of course, be more slowly filled while the discharge line L5 is open. A backwashing of the filter leafs 8 may be had by opening emptying line valve V4, filler line valve V6, and backwash line valve V8, thereby supplying the filtrate contents of the backwash tank T2 to the filtrate pump P2 and routing the filtrate back to the filter leafs 8.

In use, the fluid filter assembly 1 has a pressurized input line L1 for introducing filtrable fluids to the header box 3. The header box 3 then passes the pressurized fluid through apertures 4 located on the bottom wall 5 of the header box 3. The apertures 4 inject filtrable fluid into the filter tank T1. Within filter tank T1 are located filter leafs 8 arranged in closely spaced parallel fashion. The filtrable fluid, due to its injection into filter tank T1, flows in turbulent fashion generally downward over the filter media surfaces 9, 9′ of the filter leafs 8. The filter media will prevent passage of all particles of size greater than the media pore size into the leaf core 10. The resultant filtered fluid, or filtrate, is collected within the filter leaf core 10 and drained by the medial tube 11 to a filtrate manifold 12 connected to a vacuum source P2.

The unfiltered fluid is carried beyond the filter leafs 8 down the curved side 26 of the downstream portion 33 of the filter tank T1 to exit the tank at bottom drain 27 by way of the valved drain line L7. The unfiltered fluid is then either recycled to the filter system for further filtration of fluid and concentration of particulates, or passed out of the system. Should gathering of the particulates be desired the concentrated particle discharge line L8 may be opened by the particle discharge valve V9 to take the particles into a container or the like. The drain line valve V7 will be closed upon use of particle discharge line L8 and also when initially filling the filter assembly and then modulated as necessary to regulate drainage, back pressure and cross flow.

To clean the filter media 9, 9′ of any particulate matter adhering thereto despite the shearing action of the input fluid, the flow of filtered fluid through the filtrate manifold 12 is reversed, in a backwashing process as previously described, or alternatively, by reversing the flow of filtrate vacuum pump P2. The filtered fluid will then travel up the manifold 12, through the filter leaf medial tubes 11, into the filter leaf cores and out through the media, thereby dislodging accumulated particles on the media faces 9, 9′. Pressurized filtrable fluid may still be input to the filter tank T1 to help shear away the accumulated particles.

During this backwash process, the media 9, 9′, if unopposed, would bulge outward, possibly rupturing; or contacting other media faces 9 on parallel leafs or contacting the opposing tank walls due to the close spacing of the filter leafs 8. This contact will prevent the backwash from removing accumulated particulates. Accordingly, backwash stop-grids 14 are located within to the filter tank T1 in opposition to all media faces 9 to prevent the bulging media from contacting opposing media or tank walls.

Should particulates build up within the filter assembly either in the header box 3 or filter tank T1 over the course of time or should parts need to be replaced, the system can be easily drained, dismantled, scrubbed and flushed due to each part's open and simple design and ease of attachment.

The present invention is particularly useful in oil and water separation and high solids aqueous or organic fluids and for concentrating and/or eliminating solids.

In practicing the present invention, it should be noted that it is possible to employ a pre-filter interposed between the input line and the header box where the fluid to be filtered contains an inordinate amount of solids.

Likewise, it is to be understood that the number of filter leafs may vary, in accordance, with the size of the tank, the desired flow rates, the filtering area, porosity and pore size of the filtering media. Likewise, the filtering may be other than membranes, such as, paper, nonwoven, wire cloth, laminate, etc. However, in practice, at least two leaves are preferred. Likewise if the leaves are spaced apart sufficiently and the filtering media are sufficiently coarse or porous, then the vacuum can be eliminated since gravity will be sufficient to cause filtration.

Having, thus, described the invention, what is claimed is:

1. A cross flow fluid filter assembly comprising:
  a) a header box for receiving a fluid to be filtered under pressure, the header box having a pierced wall with apertures formed therethrough for providing fluid communication with a filter tank for delivering pressurized fluids thereto, b) a filter tank in fluid communication with the header box;
c) at least one filter leaf disposed within the tank and comprising:
  1) a fluid tight frame,
  2) a filter core having at least two abutting offset grids contained within the frame,
  3) a drain tube within said grids, the tube having at least one aperture formed therethrough,
  4) at least one filtering media sealingly covering the core,
d) means for sealingly attaching the filter leaf to a filtrate manifold such that the filter leaf drain tube and filtrate manifold are in fluid communication;
e) a filtrate manifold, the manifold being affixed within the filter tank, the manifold being in fluid communication with the exterior of the filter tank;
f) a filtrate pump operatively attached to the filtrate manifold;
g) means for draining the filter tank;
wherein each of the offset grids comprises a plurality of parallel spaced apart first members aligned in a first direction, and a plurality of parallel spaced apart second members aligned in a second direction which is substantially perpendicular with respect to the first direction, the first and second members within each offset grid intersecting at a plurality of points to define intersection junctures; and wherein the intersection junctures of the abutting grids are offset from one another.

2. The fluid filter assembly according to claim 1 further comprising:
a) at least one spacer fixedly attached to the pierced wall of the header box and extending into the filter tank, for maintaining the filter leaf position within the filter tank.

3. The fluid filter assembly according to claim 1 further comprising:
a) a backwash tank for filtrate storage,
b) means for delivering filtrate to the backwash tank, and
c) means for applying filtrate from the backwash tank to backwash the filter leaf.

4. The fluid filter assembly according to claim 1 wherein the filter leaf further comprises:
an air vent communicating between the interior and exterior of the filter leaf so as to allow the expulsion of air from the interior of the filter leaf.

5. The fluid filter assembly according to claim 1 wherein the filter leaf further comprises:
a gas permeable portion of hydrophobic material located on an upstream portion of the filter leaf.

6. A cross flow fluid filter assembly comprising:
a) a header box for receiving a fluid to be filtered under pressure, the header box having a pierced wall with apertures formed therethrough for providing fluid communication with a filter tank for delivering pressurized fluids thereto;
b) a filter tank in fluid communication with the header box;
c) at least one filter leaf disposed within the tank and comprising:
  1) a fluid tight frame;
  2) a filter core having at least two abutting offset grids contained within the frame;
  3) a drain tube within said grids, the tube having at least one aperture formed therethrough;
  4) at least one filtering media sealingly covering the core;
d) means for sealingly attaching the filter leaf to a filtrate manifold such that the filter leaf drain tube and filtrate manifold are in fluid communication;
e) a filtrate manifold, the manifold being affixed within the filter tank, the manifold being in fluid communication with the exterior of the filter tank;
f) a filtrate pump operatively attached to the filtrate manifold;
g) means for draining the filter tank;
h) a backwash tank for filtrate storage;
i) means for delivering filtrate to the backwash tank;
j) means for applying filtrate from the backwash tank to backwash the filter leaf; and
k) a backwash stop-grid placed adjacent each filtering media so as to oppose any bulging of the filtering media away from its associated filter leaf, the backwash stop-grid constructed so as to have a fluid path therethrough.

7. The fluid filter assembly of claim 6 further comprising:
a) at least one spacer fixedly attached to the pierced wall of the header box and extending into the filter tank, for maintaining the filter leaf position within the filter tank; and wherein the backwash stop-grid is affixed to the header box pierced wall and is integral with the spacer.

8. A cross flow fluid filter assembly comprising:
a) a filter tank having means for receiving a fluid to be filtered under pressure;
b) a filtrate outlet line;
c) one or more filter leafs:
  1) the filter leafs having filter media surfaces,
  2) the filter leafs contained within the filter tank, and
  3) each filter leaf in fluid communication with the filtrate outlet line;
d) means for turbulently distributing input fluid to the filter media surfaces of the filter leafs;
e) backwash stop-grids fixedly placed in opposition to all filter media surfaces;
f) means for draining the filter tank;
g) a backwash tank for filtrate storage;
h) means for delivering filtrate to the backwash tank; and,
i) means for applying filtrate from the backwash tank to backwash the filter leaf.

9. The fluid filter assembly according to claim 8 wherein the turbulent distribution means further comprises:
a header box overlying the filter leafs having;
a) means for receiving a pressurized fluid,
b) means for maintaining the spatial relationship among the filter leafs and the filter tank, and
c) apertures in fluid communication with the filter tank.

10. The fluid filter assembly according to claim 9 wherein the filter tank further comprises:
a) a first upstream section for receiving the header box;
b) a second midstream section for holding the filter leafs;
c) a third downstream section of substantially conical shape in fluid communication with the drain means.

11. The fluid filter assembly according to claim 10 wherein:
a vacuum source is attached to the filtrate outlet line.

12. The fluid filter assembly of claim 11 wherein:
the filter leaf further comprises:
a) opposing offset grids contained within a fluid tight frame;
b) a fluid tight frame;
c) a medial drain conduit having a portion internal to said frame and a portion external to said frame;
   1) the internal portion of the conduit having an aperture therethrough,
   2) the external portion of the conduit being fluid-tight with said frame and being further sealingly attachable to the filtrate outlet line,
   3) the frame having a porous filter media covering the periphery of said frame;
d) a porous filter media for forming a barrier to the interior of said filter leaf.
e) means for expulsion of trapped air from the interior of the filter leaf.

13. The fluid filter assembly according to claim 12 wherein the means for expulsion of trapped air includes a hydrophobic strip of gas permeable material capable of releasing trapped air throughout filter operations.

14. The fluid filter assembly according to claim 13 wherein:
the backwash stop-grids further comprise means for permitting substantially unimpeded fluid flow therethrough.

15. The fluid filter assembly according to claim 14 wherein:
the plurality of filter leafs are arranged in parallel within the tank.

16. The fluid filter assembly according to claim 9 wherein:
the backwash stop-grid is affixed to the header box.

17. The fluid filter assembly according to claim 8 wherein said backwash stop-grids comprise netting operably attached to the filter leaf and overlying the filter media.

18. The fluid filter assembly according to claim 8 wherein the drain means further comprises:
(a) a drain line,
(b) a discharge line for containment of concentrated particulates, the discharge line having a separate downstream terminus from the drain line.

19. The fluid filter assembly according to claim 8 wherein the drain means futher comprises:
a drain line having a modulating drain valve for the variable control of fluid flow therethrough.

20. The fluid filter apparatus of claim 8, wherein the filtrate outlet line further comprises:
a manifold for receiving the filtrate of the filter leafs, the manifold being releasably mounted within the filter tank by a quick-release mechanism.

* * * * *